United States Patent [19]

Sahara et al.

[11] Patent Number: 4,624,228

[45] Date of Patent: Nov. 25, 1986

[54] INTAKE SYSTEM FOR DIESEL CYCLE ENGINES

[75] Inventors: Masanori Sahara; Takumi Nishida; Osamu Sado; Masaaki Kashimoto, all of Hiroshima, Japan

[73] Assignee: Mazda Motor Corporation, Hiroshima, Japan

[21] Appl. No.: 741,961

[22] Filed: Jun. 6, 1985

[30] Foreign Application Priority Data

Jun. 10, 1984 [JP] Japan .............................. 59-85941[U]

[51] Int. Cl.⁴ ................................................ F02D 9/02
[52] U.S. Cl. .................................. 123/378; 123/569; 123/572
[58] Field of Search ............... 123/376, 378, 382, 401, 123/403, 568, 569, 571, 572

[56] References Cited

U.S. PATENT DOCUMENTS

| | | | |
|---|---|---|---|
| 4,240,395 | 12/1980 | Simko et al. | 123/382 X |
| 4,354,476 | 10/1982 | Straubel | 123/569 |
| 4,401,078 | 8/1983 | Kato et al. | 123/378 X |
| 4,450,806 | 5/1984 | Miura et al. | 123/403 |
| 4,463,721 | 8/1984 | Hayashi et al. | 123/378 |
| 4,493,295 | 1/1985 | Ampferer | 123/572 X |
| 4,519,369 | 5/1985 | Kitamura | 123/403 |

FOREIGN PATENT DOCUMENTS 165935 11/1980 Japan .
139844 10/1981 Japan .
154538 11/1981 Japan .

OTHER PUBLICATIONS

"Internal Combustion Engine", vol. 20, No. 257, Dec. 1981, pp. 19 through 21.

Primary Examiner—Willis R. Wolfe, Jr.
Attorney, Agent, or Firm—Fleit, Jacobson, Cohn & Price

[57] ABSTRACT

A diesel engine intake system including a timing valve which is positioned in the intake system in engine starting and warming-up periods under a cold engine condition. The timing valve is opened in the final period of the intake stroke so that a strong suction pressure is produced in the combustion chamber before the timing valve is opened. When the timing valve is opened, the intake air as rushes into the combustion chamber at a high speed, whereby the intake air is compressed under the inertia of the high speed flow to thereby increase the temperature of the intake air. The engine is also provided with a blow-by passage and an exhaust gas recirculation passage, both opening to the intake passage upstream of the timing valve, so that it is possible to prevent the blow-by gas and the recirculated exhaust gas from being drawn under the suction pressure when the timing valve is closed.

18 Claims, 7 Drawing Figures

INTAKE SYSTEM FOR DIESEL CYCLE ENGINES

BACKGROUND OF THE INVENTION

1. Field of the Invention

The present invention relates to diesel cycle engines, and more particularly to intake systems for diesel cycle engines. More specifically, the present invention pertains to intake systems having means for improving engine starting and warming up properties, as well as gas drawing systems for introducing into the intake systems gaseous substances such as blow-by gas or exhaust gas.

2. Description of the Prior Art

In diesel cycle engines, efforts have continuously been made to improve starting and warming-up properties. In order to improve the properties, it has been recognized as being effective to increase the temperature of the intake gas as it is drawn into the combustion chamber. In order to accomplish this purpose, proposals have been made to have the intake gas compressed in the final period of the intake stroke to thereby raise the temperature thereof. For example, Japanese utility model application 54-65135 filed on May 16, 1979, and published for public inspection on Nov. 28, 1980, under the disclosure No. 55-165935, teaches to provide the intake passage with an intake throttle valve which is adapted to be closed in the engine starting period and to open the exhaust valve momentarily in the final period of the intake stroke and the beginning period of the compression stroke. With this arrangement, a strong suction pressure is produced in the combustion chamber in the intake stroke due to the influence of the throttle valve so that the exhaust gas is rapidly drawn into the combustion chamber as soon as the exhaust valve is opened in the final period of the intake stroke. The exhaust gas thus drawn into the combustion chamber functions to compress the intake air to thereby increase the temperature of the intake air. The temperature of the exhaust gas itself also has an effect of increasing the temperature of the intake air. A similar system is also disclosed by Japanese utility model disclosure No. 56-154538, which has been published on Nov. 18, 1981.

It has been reported by Hiroshi Kanesaka et al. in the 14th CIMAC Helsinki Conference that this type of intake system has shown significantly improved starting and warming-up properties. It should, however, be noted that the proposed system is disadvantageous in that there is a high possibility that the exhaust gas is drawn back into the combustion chamber not only in the starting and warming-up periods but also during other engine operating conditions. According to the proposals made by the aforementioned utility models, the exhaust cam for actuating the exhaust valve is formed with an auxiliary lobe in addition to a main lobe, so that the exhaust valve is opened by the main lobe to provide the exhaust stroke and by the auxiliary lobe in the final period of the intake stroke and the beginning period of the compression stroke to have the exhaust gas drawn back to the combustion chamber. In this structure, it is understood that the auxiliary lobe on the exhaust cam operates throughout the engine operation so that the exhaust valve is opened in the final period of the intake stroke even when the engine is operated under load. Since the exhaust gas pressure is higher than the intake gas pressure even when the intake throttle valve is wide open, it is very likely that the exhaust as is drawn back into the combustion chamber under heavy load engine operation, causing a decrease in the engine output.

It is, of course, possible to design the exhaust valve operating mechanism so that the auxiliary lobe is effective only in the starting and warming-up periods. However, this solution is undesirable because the valve actuating mechanism becomes very complicated and unreliable.

It should further be noted that the intake throttle valve, which is closed in the starting and warming-up periods, causes further problems in the case where the engine has a gas drawing system for drawing blow-by gas into the intake system in order to prevent the blow-by gas from being discharged into the atmosphere, or for recirculating a controlled amount of exhaust gas into the intake system for the purpose of decreasing nitrogen oxides in the exhaust gas. The blow-by gas or the exhaust gas drawn to the combustion chamber through the gas drawing systems may weaken the suction pressure produced in the combustion chamber so the speed of the exhaust gas flow is decreased to an extent that the compression effect is undesirably weakened. Further, when the blow-by gas is drawn by strong suction pressure, it will be introduced into the combustion chamber without being sufficiently separated from liquid oil. It should further be noted that, in a diesel engine having an exhaust gas recirculation system which is operated during the engine starting period as well for raising the intake gas temperature, the amount of recirculated exhaust gas will be undesirably increased under the influence of the suction pressure, causing a shortage of oxygen in the intake gas.

SUMMARY OF THE INVENTION

It is therefore an object of the present invention to provide an intake system for diesel engines in which the intake air can be compressed during the starting and warming-up periods as it is introduced into the combustion chamber under the inertia of the intake air flow.

Another object of the present invention is to provide an intake system for diesel engines, which has means for compressing the intake air under inertia in the starting and warming-up periods without having any adverse influence on the engine operation under load.

A further object of the present invention is to provide a diesel engine intake system having means for compressing the intake air by intensifying the suction pressure in the combustion chamber without being affected by gas drawing means which is provided for drawing blow-by gas and/or recirculated exhaust gas into the combustion chamber.

According to the present invention, the above and other objects can be accomplished by an intake system for diesel cycle engines comprising intake passage means leading through intake port means to combustion chamber means, timing valve means provided in said intake passage means for normally closing said intake passage means in a predetermined period of the intake stroke, wherein the intake port means is opened to said combustion chamber means, and gas drawing means opening to said intake passage means upstream of the timing valve means. The gas drawing means may be means for drawing the blow-by gas into the intake passage means, or exhaust gas recirculation means.

In a preferable aspect, the timing valve means is provided retractably in the intake passage means and control means is provided for retracting said timing valve means from said intake passage means under an engine temperature higher than a predetermined value. The timing valve means may be provided with control means for opening the valve means in a final period of the intake stroke. Preferably, the control means includes suction pressure responsive means for opening the valve means under a suction pressure in the intake valve means downstream of the timing valve means.

The above and other objects and features of the present invention will become apparent from the following description of a preferred embodiment taking reference to the accompanying drawings.

DESCRIPTION OF THE PREFERRED EMBODIMENT

Figure 1:
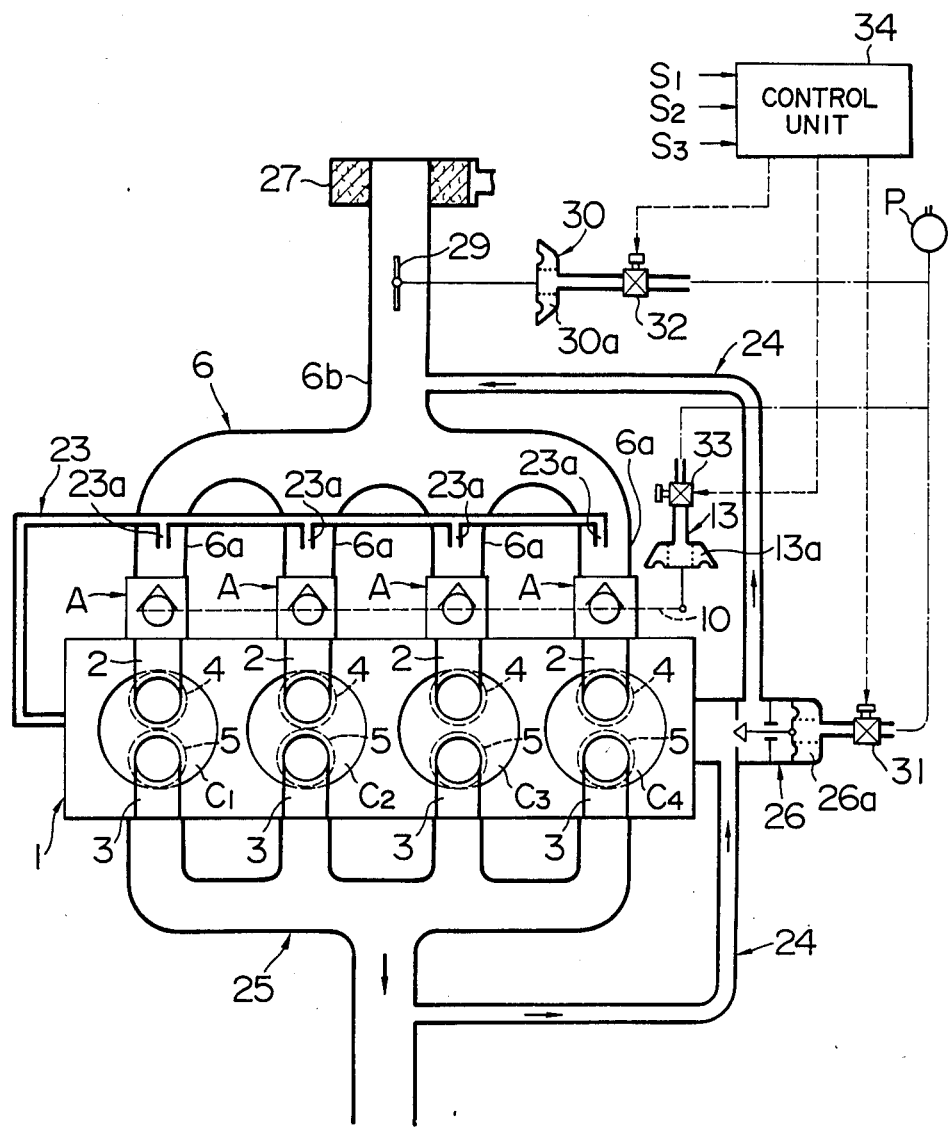
FIG. 1 is a diagrammatical view of a diesel cycle engine having an intake system in accordance with one embodiment of the present invention.
Figure 2:
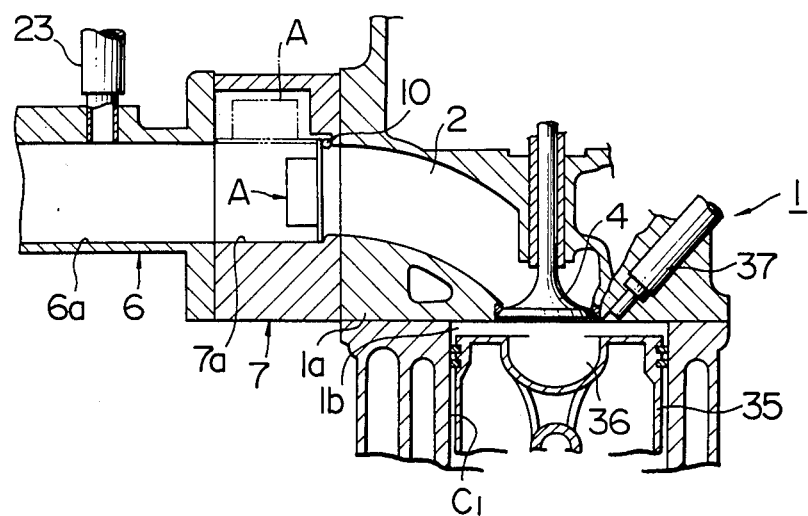
FIG. 2 is a sectional view showing the arrangement of a timing valve.

Referring to the drawings, particularly to FIG. 1, there is shown a four stroke diesel cycle engine including a cylinder block 1 formed with four cylinder bores $C_1$, $C_2$, $C_3$ and $C_4$. As shown in FIG. 2, a cylinder head 1a is attached to the top of the cylinder block 1 and a piston 35 is received in each cylinder bore for reciprocating movements. Thus, a combustion chamber 1b is defined in each cylinder bore. The cylinder head 1a is formed with intake ports 2 and exhaust ports 3 which open to the respective combustion chambers 1b. Each of the intake ports 2 is provided with an intake valve 4 and each of the exhaust ports 3 is provided with an exhaust valve 5. The piston 35 is formed at the top with a cavity 36 and a fuel injector 37 is mounted on the cylinder head 1a so as to inject fuel toward the cavity 36 in the piston 35. Although not shown in the drawings, the engine has valve actuating mechanisms for actuating the intake and exhaust valves 4 and 5 at appropriate timings.

The exhaust ports 3 are connected with an exhaust manifold 25. There is also provided an intake manifold 6 which includes branch intake passages 6a and a main intake passage 6b communicating with the branch passages 6a. The branch passages 6a are respectively connected with the intake ports 2 for the cylinder bores $C_1$, $C_2$, $C_3$ and $C_4$. The main intake passage 6b is provided at the upstream end with an air cleaner 27.

Figure 3:
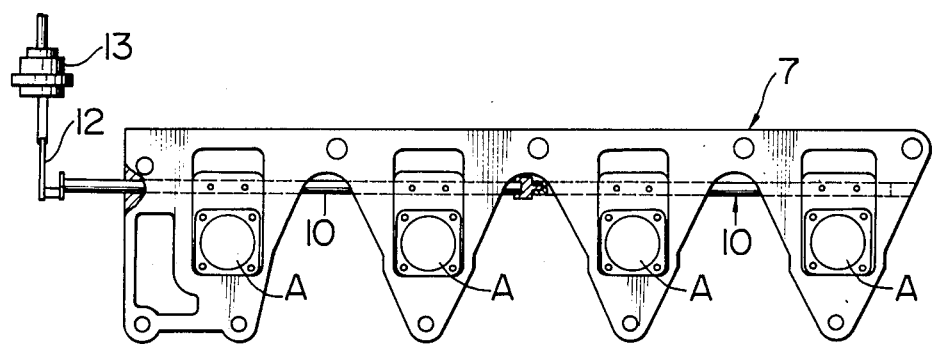
FIG. 3 is a front view of the timing valve retracting mechanism.

At the junction between each intake port 2 and the branch intake passage 6a, there is provided a timing valve A which in the illustrated embodiment is of a suction pressure responsive type. As shown in detail in FIGS. 3 and 4, the timing valves A are carried by a valve support block 7 which is disposed between the cylinder block 1 and the intake manifold 6. The valve support block 7 is formed with connecting passages 7a which connect the respective ones of the branch passages 6a with the corresponding intake ports 2.

Figure 4:
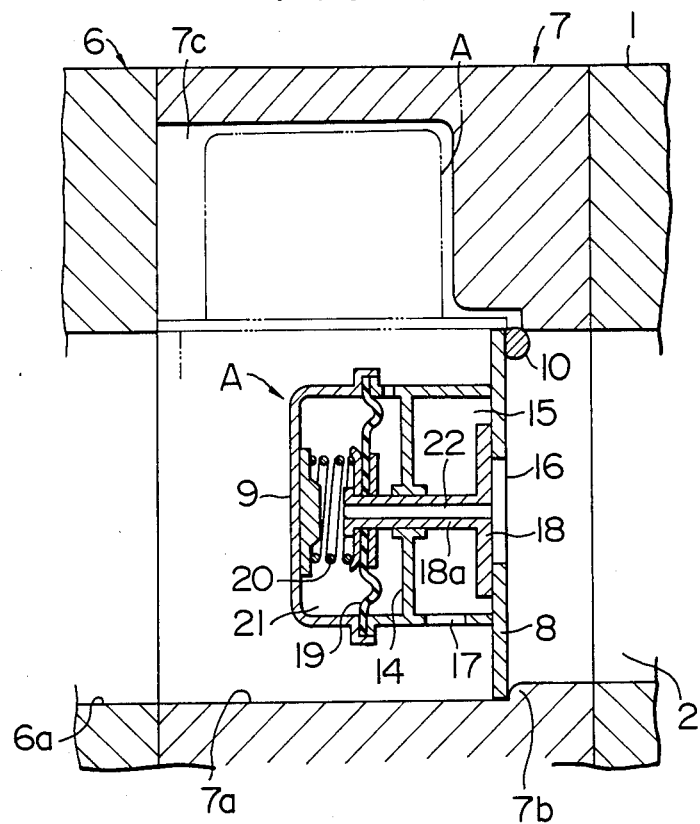
FIG. 4 is a sectional view showing the details of the timing valve.

It will be noted in FIG. 4 that the timing valve A includes a valve plate 8 having a valve opening 16 and a cup-shaped casing 9 attached to the valve plate 8 to cover the valve opening 16. The valve plate 8 is mounted on the valve support block 7 along one edge of the plate 8 by means of a rotatable shaft 10. The valve support block 7 is formed in each of the connecting passages 7a with a valve seat 7b which is adapted to receive three side edges of the valve plate 8. The valve support block 7 is formed, in the wall of each connecting passage 7a adjacent to the edge of the valve plate supported by the shaft 10, with a recess 7c which is sufficient to accommodate the timing valve A. It will thus be understood that the timing valve A can be moved between an operative position, wherein it is seated at three side edges of the valve plate 8 on the valve seat 7b, and a retracted position, wherein the timing valve A is retracted from the passage 7a into the recess 7c so that the branch intake passage 6a is wide open to the intake port 2. It will be noted in FIG. 3 that the valve plates 8 are connected to the shaft 10 in common and the shaft 10 projects sidewards from the valve support block 7. The projected end of the shaft 10 is connected with a link 12 which is in turn connected with a vacuum actuator 13 to be actuated thereby. Thus, by operating the actuator 13, it is possible to move the timing valve A between the operative and retracted positions.

Figure 5:
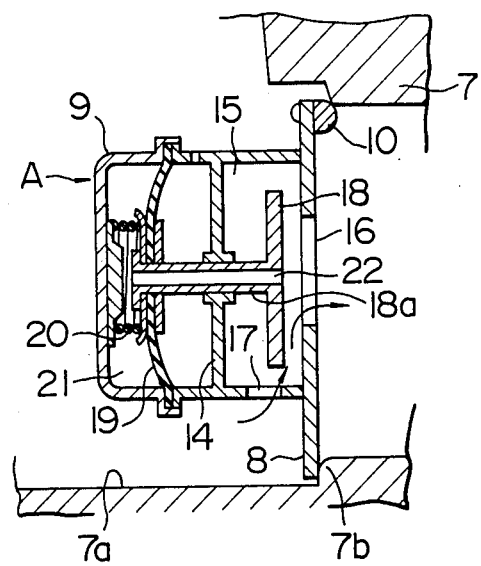
FIG. 5 is a sectional view showing the timing valve in the open position.

Referring to FIG. 4, it will be noted that the casing 9 of the timing valve A has a partition wall 14 defining a valve chamber 15 at a side adjacent to the valve plate 8. The casing 9 is formed with an opening 17 opening to the valve chamber 15. At the side of the partition wall 14 opposite to the valve chamber 15, there is provided a diaphragm 19 which defines a suction pressure chamber 21 at the side remote from the valve chamber 15. A valve member 18 is disposed in the valve chamber 15 to close the opening 16 in the valve plate 8. The valve member 18 has a valve stem 18a which extends through the partition wall 14 and is connected at the end with the diaphragm 19. The diaphragm 19 is biased by a spring 20 toward the valve plate 8 so that the valve member 18 is forced into a position wherein it closes the opening 16 in the valve plate 8. In the valve stem 18a, there is formed a suction pressure passage 22 so that the pressure in the intake port 2 is transmitted into the suction pressure chamber 21. It will therefore be understood that when the pressure in the intake port 2 is decreased below a predetermined level, or in other words, when the suction pressure in the intake port 2 becomes stronger than a predetermined level, the suction pressure transmitted into the suction pressure chamber 21 causes a deflection of the diaphragm 19 toward the left as seen in the plane of FIG. 4, against the action of the spring 20, to make the valve member 18 move away from the valve plate 8 to thereby uncover the opening 16 as shown in FIG. 5.

Referring again to FIG. 1, it will be noted that the engine is provided with a blow-by gas passage 23 which has one end opened as in conventional engines to the top space in the cylinder head 1a wherein the valve actuating mechanisms are housed. The blow-by gas passage 23 has gas outlets 23a which open to respective ones of the branch intake passages 6a upstream of the timing valves A.

There is also provided an exhaust gas recirculation passage 24 which has one end opened to the exhaust manifold 25 and the other end opened to the main intake passage 6b. In the passage 24, there is provided an exhaust gas recirculation valve 26 which has a vacuum chamber 26a. The valve 26 is of such a type that, when a suction pressure is introduced into the vacuum chamber 26a, the valve 26 is opened to allow the exhaust gas to pass through the passage 24. In the main intake passage 6b, there is provided a throttle valve 29 for the purpose of controlling the quantity of the exhaust gas recirculated through the passage 24 to the main intake passage 6b. The throttle valve 29 is provided upstream of the point where the passage 24 is opened to the main intake passage 6b and is connected with a vacuum actuator 30 having a vacuum chamber 30a. The opening of the throttle valve 29 is therefore determined by the suction pressure in the vacuum chamber 30a.

The vacuum chamber 30a in the actuator 30 is connected through a solenoid valve 32 to a vacuum pump P. The solenoid valve 32 is of a duty factor type so that the pressure in the chamber 30a can be determined by the signal applied to the solenoid valve 32. The throttle valve 29 functions to produce an appropriate suction pressure in the main intake passage 6b to draw a desired quantity of the exhaust gas to the intake system when the valve 26 is opened.

The vacuum chamber 26a of the valve 26 is connected through a solenoid valve 31 to the vacuum pump P so that the valve 26 is opened when the solenoid valve 31 is energized to open. The actuator 13 for moving the timing valves between the operative and retracted positions is of a vacuum-operated type and has a vacuum chamber 13a which is connected through a solenoid valve 33 to the vacuum pump P. When the solenoid valve 33 is energized, the vacuum chamber 13a is opened to the vacuum pump P so that the actuator 13 drives the timing valves A to the operative position.

It will be noted in FIG. 1 that there is provided a control unit 34 which receives an engine speed signal $S_1$, an engine load signal $S_2$ and an engine cooling water temperature signal $S_3$. The control unit 34 judges the engine operating condition bases on the input signals $S_1$, $S_2$ and $S_3$ and produces output signals for energizing the solenoid valves 31, 32 and 33. When it is judged that exhaust gas recirculation is necessary, the control unit 34 applies an output to the solenoid valve 31 to thereby open the valve 26. At the same time, an output is applied to the solenoid valve 32 with a duty factor which is determined in accordance with the engine operating condition. Thus, the position of the throttle valve 29 is determined in accordance with the engine operating condition.

Figure 6:
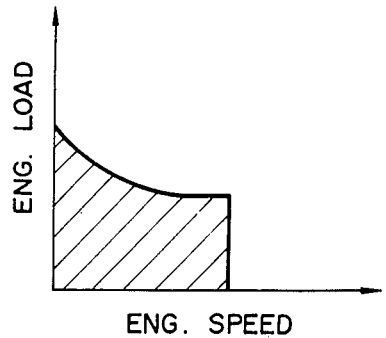
FIG. 6 is a chart showing the engine operating range wherein the timing valve is positioned in the intake passage; and, FIG. 7 is a flow chart showing the operation of the timing valve retracting mechanism.
Figure 7:
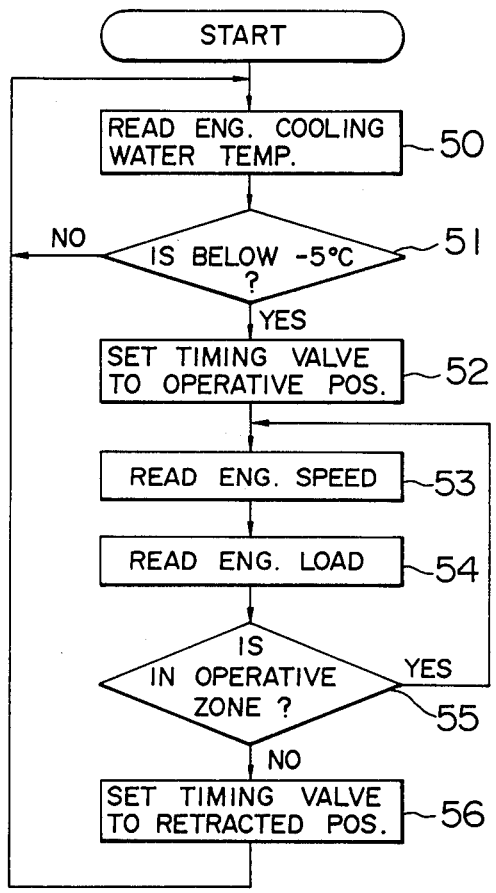

The actuator 13 is operated in accordance with the input signals $S_1$, $S_2$ and $S_3$. As shown in the flow chart of FIG. 7, the engine cooling water temperature signal $S_3$ is at first read in step 50, and a judgement is made in step 51 as to whether the engine cooling water temperature is below $-5°$ C. When the engine cooling water temperature is below $-5°$ C., the actuator 13 is operated in step 52 to move the timing valve A to the operative position. Thereafter, the engine speed signal $S_1$ and the engine load signal $S_2$ are read, respectively, in steps 53 and 54, and a judgement is made in step 55 as to whether the engine operating condition is in a timing valve operating zone. The timing valve operating zone may be defined as a zone wherein the engine speed and engine load are below predetermined levels. An example of such a zone is shown in FIG. 6 by the shadowed area. When it is judged that the engine operating condition is not in the timing valve operating zone, the actuator 13 is de-energized in step 56 to move the timing valves A into the retracted position.

When it is judged that the engine operating condition is in the timing valve operating zone, the timing valves A are held in the operative positions and the steps 53, 54 and 55 are repeated. When the timing valve A is in the operative position, the valve plate 8 sits on the seat 7b to close the passage 7b. During engine start, the timing valve A is located in the operative position as soon as the vacuum pump P is energized. When the engine is cranked, there is produced a suction pressure in the cylinder as the piston 35 descends and as the suction pressure exceeds the aforementioned predetermined level, the diaphragm 19 is deflected to move the valve member 18 away from the valve plate 8 to thereby uncover the opening 16. Thus, the intake air is drawn from the intake passage 6a into the intake port 2 producing a high speed flow which is directed into the combustion chamber 1b. The intake air thus introduced into the combustion chamber 1b is therefore compressed under the inertia of the high speed flow. This will be effective to raise the temperature of the intake air in the combustion chamber 1b to thereby ensure stable combustion of fuel. The same operation is also obtained after engine start as long as the engine operating condition is in the aforementioned timing valve operating range.

It should be noted that the blow-by gas passage 23 and the exhaust gas recirculation passage 24 are opened to the intake manifold 6 upstream of the timing valves A so that it is possible to prevent blow-by gas and exhaust gas from being drawn under the suction pressure in the combustion chambers 1b, even when the timing valves A are in the operative positions. Therefore, there is no possibility that the suction pressure in the combustion chamber can be weakened by blow-by gas and recirculated combustion gas.

In the case of a multiple-cylinder engine wherein intake strokes of the respective cylinders are overlapped with each other, the timing valve may be designed so that two or more of the timing valves do not open simultaneously by, for example, determining the resiliency of the spring 20 appropriately. By avoiding simultaneous opening of two or more timing valves A, it is possible to have the intake air compressed effectively under the inertia of the high speed intake air flow.

Although the invention has been described with reference to a structure of the timing valve which is opened under the influence of the suction pressure in the combustion chamber 1b, other types of timing valves may be used. For example, a butterfly type valve can be used without any difficulty. In such a case, the control unit 34 may be used to produce a signal for operating the valve as desired. Alternatively, a rotary valve may be used and driven in synchronism with the engine rotation. It should therefore be noted that the invention is not limited to the details of the illustrated structures, but changes and modifications may be made without departing from the scope of the appended claims.

We claim:

1. An intake system for diesel cycle engines comprising intake passage means leading through intake port means to combustion chamber means, timing valve means provided in said intake passage means in the vicinity of said combustion chamber means, control means for normally closing said timing valve means in a predetermined period of an intake stroke wherein the intake port means is opened to said combustion chamber means and for opening said timing valve means in the remaining period of the intake stroke, and gas drawing means opening to said intake passage means upstream of the timing valve means.

2. A diesel cycle engine including cylinder means and piston means disposed in said cylinder means for reciprocating movement to define combustion chamber means of variable volume in said cylinder means, said piston means being formed with cavity means opening to said combustion chamber means, fuel injection means provided on said cylinder means to inject fuel toward a side wall surface of said cavity means, intake means comprising intake passage means leading through intake port means to combustion chamber means, timing valve means provided in said intake passage means for normally closing said intake passage means in a predetermined period of an intake stroke wherein the intake port means is opened to said combustion chamber means, and gas drawing means opening to said intake passage means upstream of the timing valve means, said control means including suction pressure responsive means for opening the valve means under a suction pressure in the intake valve means downstream of the timing valve means.

3. A diesel cycle engine including cylinder means and piston means disposed in said cylinder means for reciprocating movement to define combustion chamber means of variable volume in said cylinder means, said piston means being formed with cavity means opening to said combustion chamber means, fuel injection means provided on said cylinder means to inject fuel toward a side wall surface of said cavity means, intake means comprising intake passage means leading through intake port means to said combustion chamber means, timing valve means provided in said intake pasasge means for normally closing said intake passage means in a predetermined period of an intake stroke wherein the intake port means is opened to said combustion chamber means, control means for opening the valve means in a final period of the intake stroke, and gas drawing means opening to said intake passage means upstream of the timing valve means.

4. An intake system for diesel cycle engines comprising intake passage means leading through intake port means to combustion chamber means, timing valve means provided in said intake passage means for normally closing said intake passage means in a predetermined period of an intake stroke wherein the intake port means is opened to said combustion chamber means, gas drawing means opening to said intake passage means upstream of the timing valve means, said timing valve means being movable between an operative position wherein it is located in the intake passage means and a retracted position wherein it is retracted from the intake passage means, and means for positioning said timing valve means in the operative position under an engine temperature below a predetermined value.

5. An intake system in accordance with claim 4 in which said gas drawing means is means for drawing the blow-by gas into the intake passage means.

6. An intake system in accordance with claim 4 in which said gas drawing means is exhaust gas recirculation means.

7. A diesel cycle engine including cylinder means and piston means disposed in said cylinder means for reciprocating movement to define combustion chamber means of variable volume in said cylinder means, said piston means being formed with cavity means opening to said combustion chamber means, fuel injection means provided on said cylinder means to inject fuel toward a side wall surface of said cavity means, intake means comprising intake passage means leading through intake port means to combustion chamber means, timing valve means provided in said intake passage means for normally closing said intake passage means in a predetermined period of an intake stroke wherein the intake port means is opened to said combustion chamber means, and gas drawing means opening to said intake passage means upstream of the timing valve means, said timing valve means being movable between an operative position wherein it is located in the intake passage means and a retracted position wherein it is retracted from the intake passage means, and means for positioning said timing valve means in the operative position under an engine temperature below a predetermined value.

8. A diesel engine in accordance with claim 7 in which said gas drawing means is means for drawing the blow-by gas into the intake passage means.

9. A diesel engine in accordance with claim 7 in which said gas drawing means is exhaust gas recirculation means.

10. A diesel engine in accordance with claim 7 in which said timing valve means is provided with control means for opening the valve means in a final period of the intake stroke.

11. A diesel engine in accordance with claim 7 in which said gas drawing means is at least one of means for drawing blow-by gas into the intake passage means and exhaust gas recirculation means.

12. A intake system for diesel cycle engines comprising intake passage means leading through intake port means to combustion chamber means, timing valve means provided in said intake passage means for normally closing said intake passage means in a predetermined period of an intake stroke wherein the intake port means is opened to said combustion chamber means, control means for opening the valve means in a final period of the intake stroke, and gas drawing means opening to said intake passage means upstream of the timing valve means.

13. An intake system in accordance with claim 12 in which said gas drawing means is means for drawing the blow-by gas into the intake passage means.

14. An intake system in accordance with claim 12 in which said gas drawing means is exhaust gas recirculation means.

15. An intake system in accordance with claim 12 in which said control means includes suction pressure responsive means for opening the valve means under a suction pressure in the intake valve means downstream the timing valve means.

16. An intake system in accordance with claim 15 in which said gas drawing means is means for drawing the blow-by gas into the intake passage means.

17. A diesel engine in accordance with claim 15 in which said gas drawing means is exhaust gas recirculation means.

18. An intake system in accordance with claim 15 in which said timing valve means is movable between an operative position wherein it is located in the intake passage means and a retracted position wherein it is retracted from the intake passage means, means being provided for locating said timing valve means in the operative position under an engine temperature below a predetermined value.

* * * * *